(12) United States Patent  
Yang et al.

(10) Patent No.: US 12,200,248 B2
(45) Date of Patent: Jan. 14, 2025

(54) VIDEO PROCESSING METHOD, DEVICE AND STORAGE MEDIUM

(71) Applicant: SANECHIPS TECHNOLOGY CO., LTD., Guangdong (CN)

(72) Inventors: Wei Yang, Guangdong (CN); Ke Xu, Guangdong (CN); Dehui Kong, Guangdong (CN); Jianjun Song, Guangdong (CN); Fang Zhu, Guangdong (CN)

(73) Assignee: SANECHIPS TECHNOLOGY CO., LTD., Guangdong (CN)

( * ) Notice: Subject to any disclaimer, the term of this patent is extended or adjusted under 35 U.S.C. 154(b) by 57 days.

(21) Appl. No.: 18/010,356

(22) PCT Filed: Jun. 1, 2021

(86) PCT No.: PCT/CN2021/097686
§ 371 (c)(1),
(2) Date: Dec. 14, 2022

(87) PCT Pub. No.: WO2021/254139
PCT Pub. Date: Dec. 23, 2021

(65) Prior Publication Data
US 2023/0269395 A1 Aug. 24, 2023

(30) Foreign Application Priority Data

Jun. 15, 2020 (CN) .......................... 202010544611.8

(51) Int. Cl.
*H04N 19/59* (2014.01)
*G06T 5/50* (2006.01)
(Continued)

(52) U.S. Cl.
CPC ............... *H04N 19/59* (2014.11); *G06T 5/50* (2013.01); *G06T 7/11* (2017.01); *H04N 19/51* (2014.11); *G06T 2207/20221* (2013.01)

(58) Field of Classification Search
CPC ... G06T 2207/20221; G06T 5/50; G06T 7/11; H04N 19/51; H04N 19/59
See application file for complete search history.

(56) References Cited

U.S. PATENT DOCUMENTS

| 10,097,821 B2 | 10/2018 | Gu et al. |
| 2007/0223578 A1 | 9/2007 | Klein Gunnewiek |
| 2012/0328200 A1 | 12/2012 | Liu |

FOREIGN PATENT DOCUMENTS

| CN | 1939065 A | 3/2007 |
| CN | 102196256 A | 9/2011 |

(Continued)

OTHER PUBLICATIONS

Lin et al. ("Improved Low-Bitrate HEVC Video Coding Using Deep Learning Based Super-Resolution and Adaptive Block Patching", IEEE Transactions On Multimedia, IEEE, USA, vol. 21, No. 12, Dec. 1, 2019) (Year: 2019).*

(Continued)

*Primary Examiner* — On S Mung
(74) *Attorney, Agent, or Firm* — Li & Cai Intellectual Property (USA) Office

(57) ABSTRACT

The present application provides a video processing method, a device, and a storage medium. The method includes: coding and decoding an original video to obtain a mixed resolution video, where the mixed resolution video includes a first resolution frame and a second resolution frame each corresponding to a key frame, and a third resolution frame corresponding to a non-key frame, where the first resolution frame has a resolution higher than a resolution of the second resolution frame or a resolution of the third resolution frame;

(Continued)

and amplifying, according to the first resolution frame and the second resolution frame, the third resolution frame corresponding to the non-key frame to output an amplified video, where the amplified video includes the first resolution frame corresponding to the key frame, and an amplified target frame corresponding to the non-key frame.

13 Claims, 5 Drawing Sheets

(51) Int. Cl.
*G06T 7/11* (2017.01)
*H04N 19/51* (2014.01)

(56) References Cited

FOREIGN PATENT DOCUMENTS

| CN | 102714726 A | 10/2012 |
|---|---|---|
| CN | 103813174 A | 5/2014 |
| IN | 103607591 A | 2/2014 |
| WO | WO 2006078109 A1 | 7/2006 |
| WO | WO 2019197661 A1 | 10/2019 |

OTHER PUBLICATIONS

WIPO, International Search Report issued on Aug. 13, 2021.

European Patent Office, extended European Patent Search Report dated Mar. 26, 2024, for corresponding EP application No. 21826930.6.

Jianping Lin et al.:"M-LVC: Multiple 1-14 INV. Frames Prediction for Learned Video H04N19/33 Compression". arxiv.org, Cornell University Library, 201 HO4N19/59 Olin Library Cornell University Ithaca, NY HO4N21/2343 14853,Apr. 21, 2020.

Lin Hongwei et al.: "Improved Low-Bitrate (1-14 HEVC Video Coding Using Deep Learning Based Super-Resolution and Adaptive Block Patching", IEEE Transactions On Multimedia, IEEE, USA, Dec. 1, 2019.

* cited by examiner

VIDEO PROCESSING METHOD, DEVICE AND STORAGE MEDIUM

This application claims priority to the patent application No. 202010544611.8 filed with the Chinese Patent Office on Jun. 15, 2020, the entire content of which is incorporated hereby by reference.

TECHNICAL FIELD

The present disclosure relates to, but is not limited to, video processing technologies.

BACKGROUND

In the current information era, video information occupies a higher and higher proportion, the video data volume is larger and larger, and transmission and compression of videos are particularly important. Despite continuous development of the coding and decoding technology, in areas with poor conditions, such as mountainous areas or other areas with a severe environment, due to insufficient base stations and broadband resources, video information may be lost and long transmission delay or other problems may occur. However, if the whole video is compressed to a large extent, the decoded video will have a low resolution, poor subjective and objective quality and amplification effect, severely affecting the viewing experience. There is no effective video processing method yet that can, under a scene of a severe environment, insufficient resources or limited traffic and the like, reduce resources occupied by video data transmission while decoding to obtain a high-quality video.

SUMMARY

An embodiment of the present disclosure provides a video processing method, including: coding and decoding an original video to obtain a mixed resolution video, where the mixed resolution video includes a first resolution frame and a second resolution frame each corresponding to a key frame in the original video, and a third resolution frame corresponding to a non-key frame in the original video, wherein the first resolution frame has a resolution higher than a resolution of the second resolution frame or a resolution of the third resolution frame; and amplifying, according to the first resolution frame and the second resolution frame corresponding to the key frame, the third resolution frame corresponding to the non-key frame in the mixed resolution video to output an amplified video, where the amplified video includes the first resolution frame corresponding to the key frame, and an amplified target frame corresponding to the non-key frame.

An embodiment of the present disclosure further provides a device, including: one or more processors; and a storage having one or more programs stored thereon which, when executed by the one or more processors, cause the one or more processors to perform the video processing method as described above.

An embodiment of the present disclosure further provides a computer-readable storage medium having a computer program stored thereon which, when executed by a processor, causes the processor to implement the video processing method as described above.

DETAIL DESCRIPTION OF EMBODIMENTS

Figure 1:
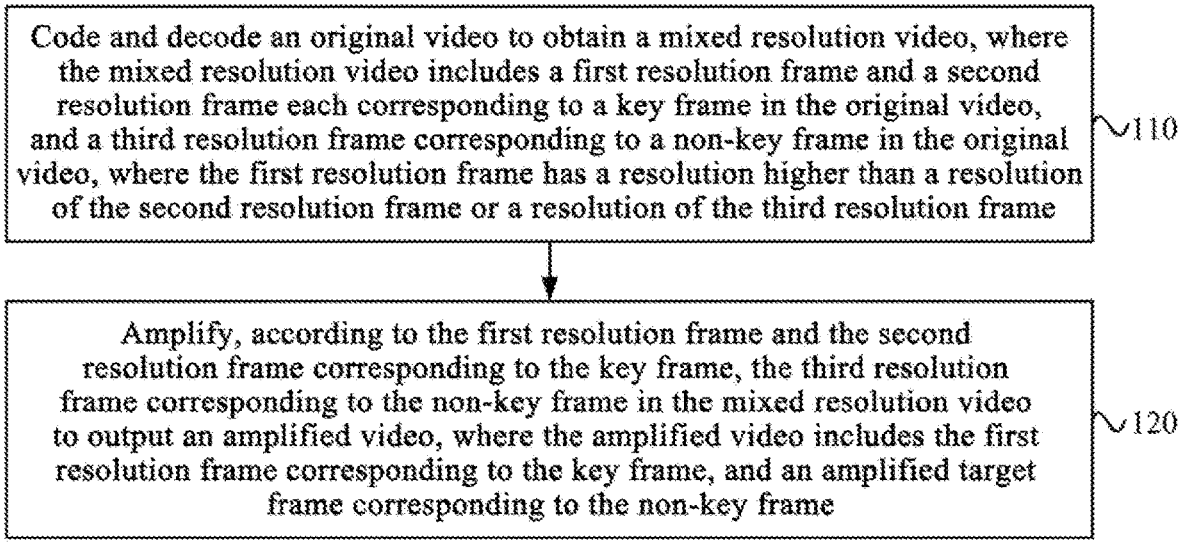
FIG. 1 is a flowchart of a video processing method according to the present disclosure.

The present disclosure will be described below with reference to the accompanying drawings and embodiments. It will be appreciated that the specific embodiments described herein are used merely for the purpose of explaining the present disclosure instead of limiting the present disclosure. It should be noted that the embodiments of the present disclosure and features therein may be combined with each other in any manner as long as they are not contradictory. It should be further noted that, for the convenience of description, merely some of the structures associated with the present disclosure, not all the structures, are shown in the drawings.

In the present disclosure, there is provided a video processing method in which a low resolution frame can be obtained from a non-key frame simply by coding and decoding, and then the low resolution frame is amplified by referring to information of a key frame, so that an amplified high resolution video is obtained with fewer code streams, the bandwidth pressure of video transmission is reduced, and the subjective and objective quality of video amplification is improved.

FIG. 1 is a flowchart of a video processing method according to the present disclosure. As shown in FIG. 1, the method of the present disclosure may include operations 110 and 120.

At operation 110, coding and decoding an original video to obtain a mixed resolution video, where the mixed resolution video includes a first resolution frame and a second resolution frame each corresponding to a key frame in the original video, and a third resolution frame corresponding to a non-key frame in the original video, where the first resolution frame has a resolution higher than a resolution of the second resolution frame or a resolution of the third resolution frame.

In the present disclosure, the original video refers to a high resolution video to be processed or transmitted. The original video is firstly subjected to coding and decoding processing to obtain a mixed resolution video in which, compared with the original video, some frames have a reduced resolution, thereby implementing compression of video data, while completing transmission with fewer resources in the process. The original video includes a key frame and a non-key frame. The key frame is, for example, a scene transition frame, a frame selected from similar frames, an I-frame of a Group of Pictures (GOP), or the like. The key frame carrying key information of a video frame may be used for summarizing a scene event of the video, while any other frame except the key frame is a non-key frame.

By means of a video codec, the key frame and the non-key frame in the original video may be subjected to different kinds of processing based on Scaled Video Coding (SVC), and the video is divided into multiple resolutions to obtain a mixed resolution video. SVC is a hybrid coding framework in which by combining spatial redundancy in video frames and temporal redundancy among the frames, different coding blocks are constructed to form a whole coding and decoding protocol. Exemplarily, for a key frame, a first resolution frame (a high resolution frame) and a second resolution frame (a low resolution frame) are obtained through a video codec; and for a non-key frame, a third resolution frame (a low resolution frame) is obtained by down-sampling, where the second resolution is the same as the third resolution, resulting in a mixed resolution video.

Figure 2:
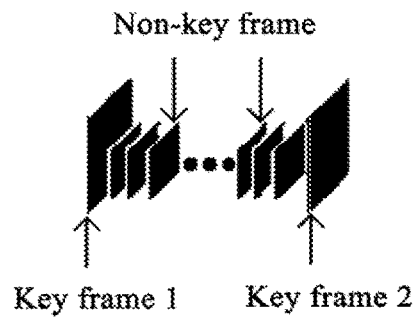
FIG. 2 is a schematic diagram of a mixed resolution video according to the present disclosure.

FIG. 2 is a schematic diagram of a mixed resolution video according to the present disclosure. As shown in FIG. 2, the larger boxes represent key frames, and the smaller boxes represent non-key frames. The mixed resolution video obtained through coding and decoding carries the high resolution frame of the key frame and the low resolution frame of the non-key frame. The high resolution frame of the key frame may provide a basis for amplification of the low resolution frame of the non-key frame.

At operation 120, amplifying, according to the first resolution frame and the second resolution frame corresponding to the key frame, the third resolution frame corresponding to the non-key frame in the mixed resolution video to output an amplified video, where the amplified video includes the first resolution frame corresponding to the key frame, and an amplified target frame corresponding to the non-key frame.

In the present disclosure, by coding and decoding, a mixed resolution video can be obtained based on a spatial grading policy (compression is performed with different spatial resolutions), so that the number of bits for video transmission and the bandwidth pressure are reduced, and resources are saved. Then, the mixed resolution video is subjected to video amplification, so that the non-key frame with the reduced resolution can be amplified to obtain the high resolution frame again. Thereby, a complete high resolution video is obtained, and complete and high-quality video information can be acquired. In the present disclosure, the third resolution frame of the non-key frame is amplified based on an intra-frame reference mode of bidirectional reference of the hybrid coding framework, which includes referring to information of key frames before and after a non-key frame, and amplifying each intermediate non-key frame. The high resolution frame of the third resolution frame after amplification is the target frame.

In the video processing method of the present disclosure, the mixed resolution video is based on SVC, where a low resolution frame can be obtained from a non-key frame simply by coding and decoding, and then the low resolution frame is amplified by referring to information of a key frame, so that an amplified high resolution video is obtained with fewer code streams, the bandwidth pressure of video transmission is reduced, and the subjective and objective quality of video amplification is improved.

Figure 3:
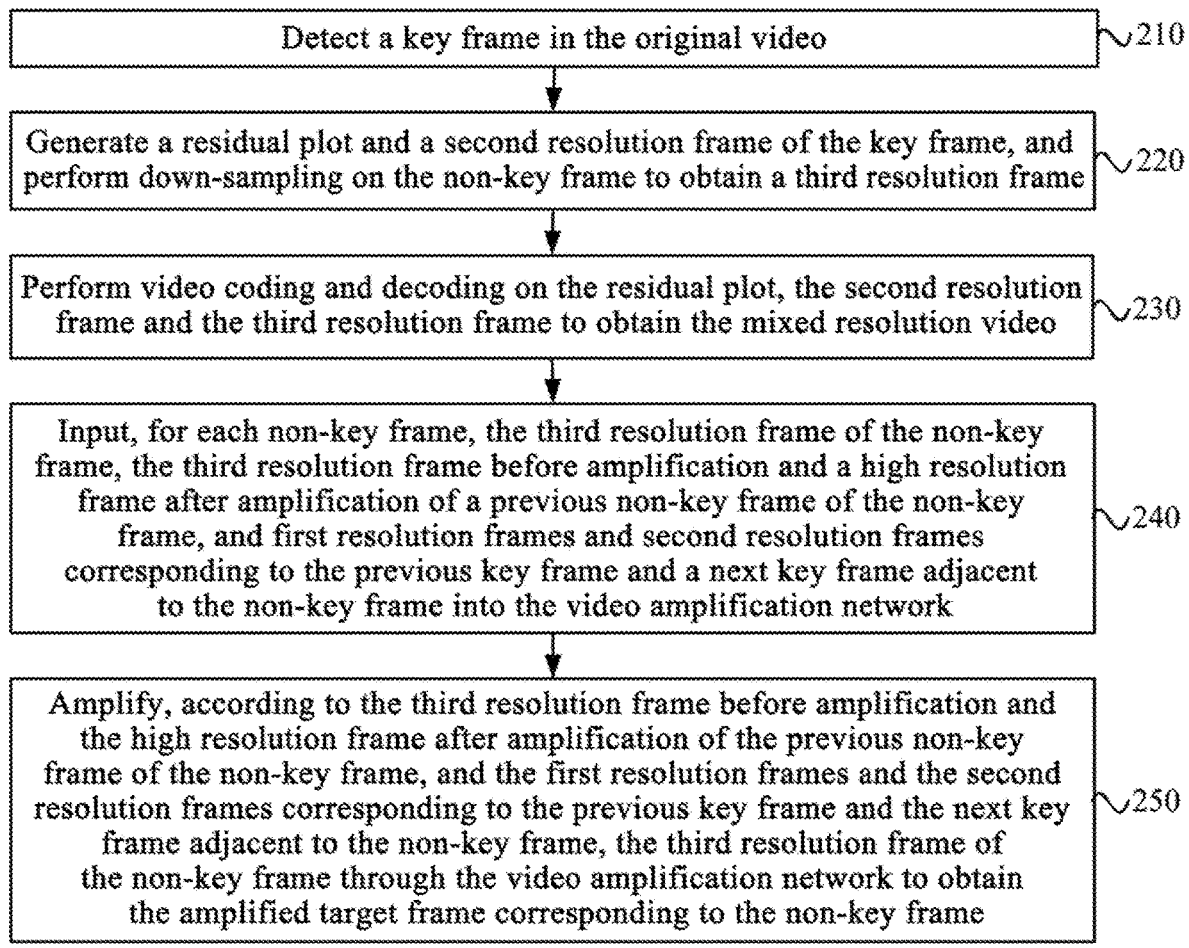
FIG. 3 is a flowchart of a video processing method according to the present disclosure.

FIG. 3 is a flowchart of a video processing method according to the present disclosure. The coding and decoding process of the original video and the video amplification process will be described with reference to FIG. 3. The video coding and decoding process utilizes a residual plot to realize SVC of the original video, while the video amplification process utilizes a trained neural network. The two are combined to ensure the efficiency of video transmission and the quality of amplification. As shown in FIG. 3, the video processing method of the present disclosure may include operations 210 to 250.

At operation 210, detecting a key frame in the original video.

Before coding and decoding the original video in high resolution, the key frame is firstly detected. In the present disclosure, a first frame (I-frame) in a GOP in the H265 protocol may be used as the key frame. The key frame is coded and decoded to obtain a first resolution frame with a higher resolution and little coding and decoding loss, and thus may be used as a reference frame in video amplification process to provide a basis for the video amplification.

At operation 220, generating a residual plot and a second resolution frame of the key frame, and performing down-sampling on the non-key frame to obtain a third resolution frame.

For a key frame, the first resolution frame and the second resolution frame are desired to be obtained after coding and decoding. For the first resolution frame, the key frame may be firstly down-sampled to obtain the second resolution frame, and then up-sampled. Next, the up-sampled frame is subtracted from the original video frame to obtain the residual plot. The residual plot can clearly reflect a change area and a non-change area between the image obtained by firstly up-sampling and then down-sampling (or obtained after splitting and splicing the key frame) and the key frame of the original video. Therefore, a change range of pixel values is smaller than that of the original image, quantization may be performed over a smaller change range, and the number of transmitted bits is reduced. For the second resolution frame, the second resolution frame with a lower resolution corresponding to the key frame may be obtained by down-sampling, image splitting, or by other means. In contrast, the non-key frame is directly compressed and down-sampled to obtain the third resolution frame with a lower resolution.

At operation 230, performing video coding and decoding on the residual plot, the second resolution frame and the third resolution frame to obtain the mixed resolution video.

The residual plot, the second resolution frame and the third resolution frame are coded to obtain a transmittable code stream, which is then decoded to obtain the mixed resolution video.

At operation 240, inputting, for each non-key frame, the third resolution frame ($I_t^{LR}$) of the non-key frame, the third resolution frame ($I_{t-1}^{LR}$) before amplification and a high resolution frame ($I_{t-1}^{SR}$) after amplification of a previous non-key frame of the non-key frame, and first resolution frames ($I_{k1}^{SR}$, $I_{k2}^{SR}$) and second resolution frames ($I_{k1}^{LR}$, $I_{k2}^{LR}$) corresponding to the previous key frame and a next key frame adjacent to the non-key frame into the video amplification network.

In the present disclosure, the non-key frame may be amplified by a video amplification network (e.g., a trained recurrent neural network) based on an intra-frame reference mode of bidirectional reference of the hybrid coding framework, referring to relationships and variations between the high resolution frames and the low resolution frames (the first resolution frames and the second resolution frames) of the key frames before and after each non-key frame and in combination with an amplification result of a previous non-key frame. In this case, when a non-key frame is amplified, the video amplification network has seven inputs, including:

a third resolution frame ($I_t^{LR}$) of the non-key frame;

a first resolution frame ($I_{k1}^{SR}$) and a second resolution frame ($I_{k1}^{LR}$) corresponding to a previous key frame adjacent to the non-key frame;

a first resolution frame ($I_{k2}^{SR}$) and a second resolution frame ($I_{k2}^{LR}$) corresponding to a next key frame adjacent to the non-key frame; and a third resolution frame ($I_{t-1}^{LR}$) before amplification and a high resolution frame ($I_{t-1}^{SR}$) after amplification of a previous non-key frame of the non-key frame.

At operation 250, amplifying, according to the third resolution frame ($I_{t-1}^{LR}$) before amplification and the high resolution frame ($I_{t-1}^{SR}$) after amplification of the previous non-key frame of the non-key frame, and the first resolution frames ($I_{k1}^{SR}$, $I_{k2}^{SR}$) and the second resolution frames ($I_{k1}^{LR}$, $I_{k2}^{LR}$) corresponding to the previous key frame and the next key frame adjacent to the non-key frame, the third resolution frame ($I_t^{LR}$) of the non-key frame through the video amplification network to obtain the amplified target frame corresponding to the non-key frame.

The video amplification network of the present disclosure may be a trained recurrent neural network, and the working principle of the network is that: first resolution frames (high resolution frames) and second resolution frames (low resolution frames) corresponding to two adjacent key frames are input to serve as reference frames for the third resolution frame (a low resolution frame) of the whole intermediate non-key frame, while the third resolution frame before amplification and the high resolution frame after amplification of a previous non-key frame are also input, so that with the recurrent neural network and according to a spatial-temporal relationship between each reference frame and a current frame, the third resolution frame of the current non-key frame can be amplified. The current non-key frame refers to reference frames in two directions, so that when the scene changes, information of a forward low resolution frame and a backward high resolution frame can be fully utilized to ensure the amplification effect of the current non-key frame.

In an implementation, the operation 220 of generating the residual plot and the second resolution frame of the key frame includes operations 221 and 222.

At operation 221, performing down-sampling on the key frame to obtain the second resolution frame of the key frame.

In this implementation, the key frame is down-sampled to obtain the second resolution frame (low resolution frame) of the key frame, where the down-sampling may be implemented by a bilinear or bicubic method, and in the decoding process, the key frame is up-sampled in a same method.

At operation 222, performing up-sampling on the second resolution frame of the key frame to obtain a temporary frame of the first resolution frame of the key frame, and subtracting the temporary frame of the first resolution frame from the key frame to obtain the residual plot of the key frame.

In this implementation, the second resolution frame of the key frame is up-sampled to obtain a temporary frame (a high resolution frame) of the first resolution frame of the key frame, and the temporary frame of the first resolution frame is subtracted from a real key frame (a ground truth frame) in the original video to obtain the residual plot. The residual plot can clearly reflect a change area and a non-change area between the first resolution frame and the key frame of the original video, so that the processing amount of coding and decoding is reduced, and resources for coding and decoding as well as transmission are saved. The residual plot may be coded to obtain a residual code stream. In the decoding process, the second resolution frame (low resolution frame) of the key frame is firstly obtained by decoding, and an amplified image (referred to as a fourth resolution frame) is obtained by up-sampling, then the residual code stream is decoded to obtain the residual plot, and the amplified image and the residual plot are added to obtain the first resolution frame of the key frame. In this implementation, the coding and decoding of the residual plot are desired to be performed at a high resolution, and when a chip is designed, clocks for decoding the high resolution frame and the low resolution frame are set separately.

In an implementation, the operation 230 may include operations 231 to 233.

At operation 231, coding the residual plot, the second resolution frame and the third resolution frame with a coder, to obtain a residual code stream, a code stream of the second resolution frame and a code stream of the third resolution frame.

At operation 232, decoding the residual code stream, the code stream of the second resolution frame and the code stream of the third resolution frame with a decoder, to respectively obtain the residual plot, the second resolution frame and the third resolution frame.

At operation 233, performing up-sampling on the second resolution frame to obtain an amplified fourth resolution frame, and adding the fourth resolution frame and the residual plot to obtain the first resolution frame of the key frame.

In this implementation, during video coding and decoding, the residual plot is firstly coded to obtain a residual code stream, while the second resolution frame and the third resolution frame are also coded (compressed) and transmitted; and in the decoding process, the second resolution frame (low resolution frame) of the key frame is firstly obtained by decoding, and an amplified image (referred to as a fourth resolution frame) is obtained by up-sampling, then the residual code stream is decoded to obtain the residual plot, and the amplified image and the residual plot are added to obtain the first resolution frame of the key frame. In this implementation, the coding and decoding of the residual plot are desired to be performed at a high resolution, and when a chip is designed, clocks for decoding the high resolution frame and the low resolution frame are set separately.

In an implementation, the operation 110 may include operations 111 to 115.

At operation 111, detecting a key frame in the original video.

At operation 112, equally dividing the key frame into a plurality of sub-images, where each sub-image has a same resolution as that of the second resolution frame, and performing down-sampling on the non-key frame to obtain a third resolution frame.

At operation 113, inputting the sub-images and the third resolution frame of the non-key frame into a video codec, where the video codec includes a coder and a decoder.

At operation 114, coding the sub-images and the third resolution frame of the non-key frame with the coder, to obtain code streams corresponding to the sub-images and the third resolution frame of the non-key frame.

At operation 115, splicing the sub-images according to the code stream of each sub-image with the decoder, to obtain the first resolution frame of the key frame, and decoding the code stream of the third resolution frame to obtain the third resolution frame.

In this implementation, the non-key frame is down-sampled and coded/decoded to obtain the third resolution frame, while for the key frame, the second resolution frame is obtained by down-sampling. In addition, the key frame is divided into a plurality of sub-images which are then spliced to obtain the first resolution frame, that is, the key frame of a high resolution in the original video is divided into several sub-images of a same size, which are spliced by a codec later to form a high resolution image. The resulted image is the first resolution frame of the key frame, and has a resolution higher than the key frame in the original video. The first resolution frame of the key frame can be obtained either by the dividing method or the up-sampling method, and in this implementation, the dividing method is mainly applicable to a video processing scene with low timeliness requirement, while under the condition that a super resolution method involves a large amplification factor, if the dividing method is adopted, it may lead to prolonged decoding process and delay since more sub-images are to be divided.

In an implementation, the video amplification network includes a motion estimation sub-network, a motion compensation sub-network, and an amplification sub-network.

In this implementation, the video amplification network includes three sub-networks: a motion estimation sub-network, a motion compensation sub-network, and an amplification sub-network. During the amplification process, motion vector estimation of a low resolution frame and motion compensation of a high resolution frame are both considered, so that more sufficient information of the reference frames can be obtained, and the quality of video amplification can be improved.

In an implementation, the operation 250 may include operations 251 to 253.

At operation 251, respectively performing, based on the third resolution frame ($I_t^{LR}$) of the non-key frame, motion estimation on the third resolution frame ($I_{t-1}^{LR}$) before amplification of the previous non-key frame of the non-key frame, and the second resolution frames ($I_{k1}^{LR}$, $I_{k2}^{LR}$) corresponding to the previous key frame and the next key frame adjacent to the non-key frame through the motion estimation sub-network.

During inter-frame prediction, since scenes in adjacent frames have certain correlation, the non-key frame may be divided into a plurality of blocks or macro blocks, and a position of each block or macro block in an adjacent frame may be searched out, so that a relative offset in the spatial position between the two blocks or macro blocks, i.e., a motion vector, can be obtained, and through motion estimation of the vector, the inter-frame redundancy can be removed and the number of bits for video transmission is greatly reduced.

In this implementation, for each non-key frame, motion vectors between the low resolution frame $I_t^{LR}$ of the non-key frame and the other three low resolution frames are estimated, i.e., motion vectors between $I_t^{LR}$ and $I_{t-1}^{LR}$, $I_t^{LR}$ and $I_{k1}^{LR}$, and $I_t^{LR}$ and $I_{k2}^{LR}$ are estimated.

At operation 252, respectively performing, according to the high resolution frame ($I_{t-1}^{SR}$) after amplification of the previous non-key frame and the first resolution frames ($I_{k1}^{SR}$, $I_{k2}^{SR}$) corresponding to the previous key frame and the next key frame adjacent to the non-key frame, motion compensation on each frame subjected to motion estimation and an up-sampled motion vector to obtain an intermediate high resolution feature map, and converting the intermediate high resolution feature map into a low resolution feature map through shuffle.

In this implementation, for each non-key frame, motion compensation are performed on each frame subjected to motion estimation and an up-sampled motion vector to obtain an intermediate high resolution feature map, and then the intermediate high resolution feature map is converted into a low resolution feature map through shuffle. The motion vector can be roughly estimated through motion estimation, and the estimation result can be refined through motion compensation, so that the offset between frames is clearer and the amplification sub-network can obtain more valid inputs.

At operation 253, amplifying, according to the low resolution feature map, the third resolution frame through the amplification sub-network to obtain the amplified target frame corresponding to the non-key frame.

In the video processing method of the present disclosure, the third resolution frame is amplified according to a spatial-temporal relationship between frames, so that the amplified video will not jitter, and a more coherent visual effect is obtained.

Figure 4:
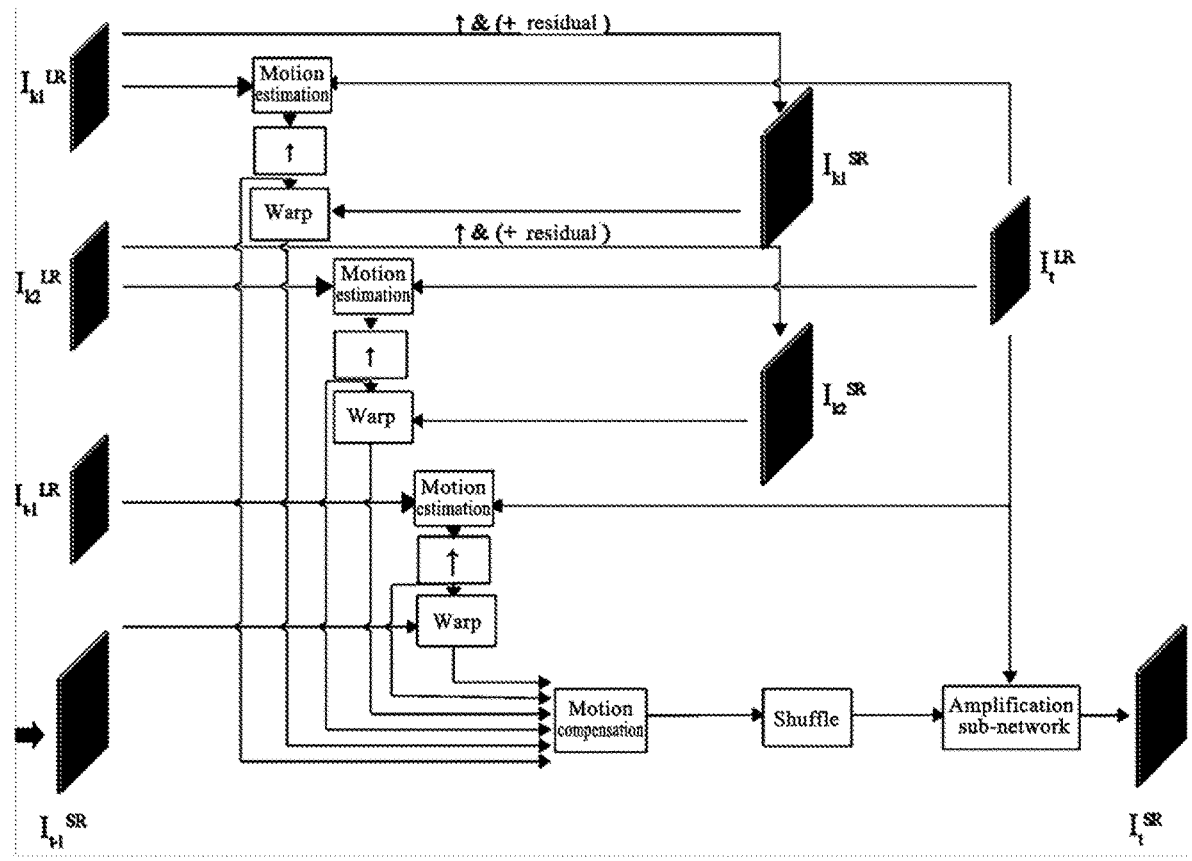
FIG. 4 is a schematic diagram of a video amplification network according to the present disclosure.

FIG. 4 is a schematic diagram of a video amplification network according to the present disclosure. In the present disclosure, the video amplification network uses a convolutional recurrent neural network to implement amplification of the low resolution frame in the mixed resolution video. The video amplification network has a network architecture as shown in FIG. 4, and includes three parts: a motion estimation sub-network, a motion compensation sub-network, and an amplification sub-network which may be a super resolution network (SRNet). There are three motion estimation sub-networks, which are respectively configured to estimate vectors between $I_t^{LR}$ and $I_{t-1}^{LR}$, $I_t^{LR}$ and $I_{k1}^{LR}$, and $I_t^{LR}$ and $I_{k2}^{LR}$, and which have shared parameters. $I^{LR}$ represents a low resolution frame in the coded and decoded mixed resolution video, $I^{SR}$ represent a high resolution frame in the mixed resolution video, for example, $I_{k1}^{LR}$ and $I_{k2}^{LR}$ are low resolution frames (second resolution frames) corresponding to a previous key frame and a next key frame, respectively, $I_{k1}^{SR}$ and $I_{k2}^{SR}$ are high resolution frames (first resolution frames) corresponding to the previous key frame and the next key frame, respectively, $I_t^{LR}$ represents a low resolution frame (third resolution frame) of a current non-key frame to be amplified, and $I_{t-1}^{LR}$ and $I_{t-1}^{SR}$ are a low resolution frame and an amplified high resolution frame of a previous non-key frame, respectively.

In an implementation, the video amplification process may further include the operations of:

"↑", which represents an up-sampling operation;

a warp operation, including shifting a high resolution pixel to a position defined by a current pixel position added by a motion vector; and a shuffle operation, including a shuffle operation on a spatial channel feature map.

Figure 5:
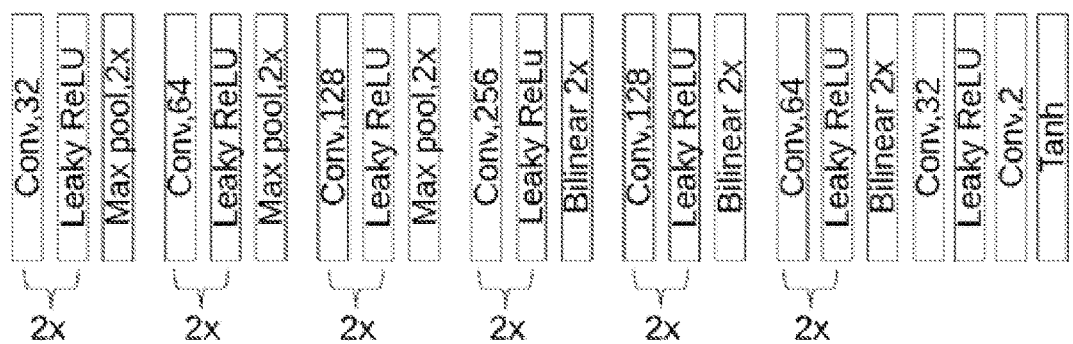
FIG. 5 is a schematic diagram of a motion estimation sub-network according to the present disclosure.

FIG. 5 is a schematic diagram of a motion estimation sub-network according to the present disclosure. As shown in FIG. 5, the motion estimation sub-network may include a convolutional layer (Conv), in which the convolution kernel may have 32, 64, 128, 256 channels or the like; an activation layer, such as a leaky rectified linear unit excitation layer and a hyperbolic tangent (Tanh) excitation layer; and a max pool layer and a bilinear transform layer.

Figure 6:
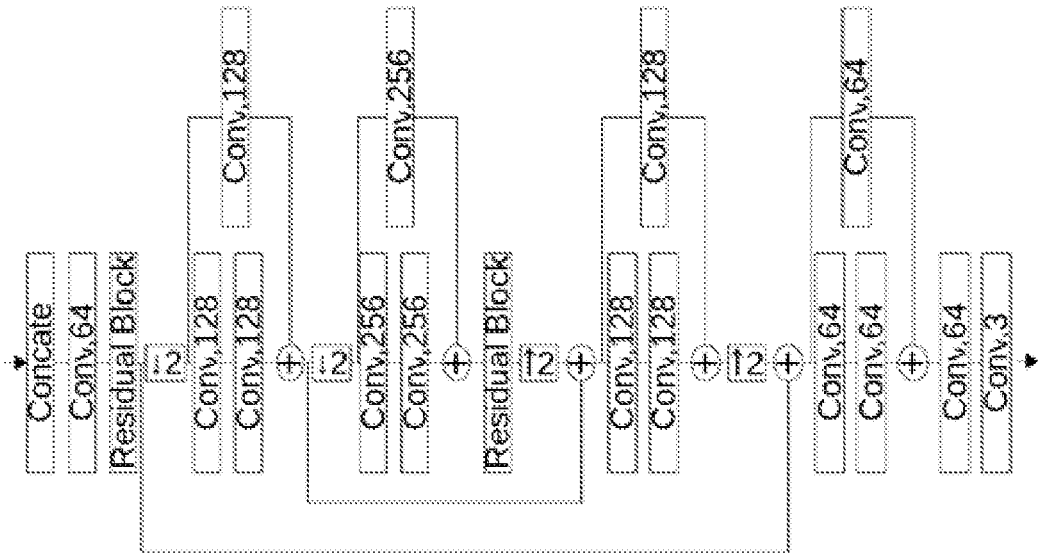
FIG. 6 is a schematic diagram of a motion compensation sub-network according to the present disclosure.

FIG. 6 is a schematic diagram of a motion compensation sub-network according to the present disclosure. As shown in FIG. 6, the sub-network includes a concatenate (Concate) layer configured to splice two or more feature maps on a channel; a convolutional layer (Conv), in which the convolution kernel may have 64, 128, 256 channels or the like; a residual block; a down-sampling layer (denoted as "↓") and an up-sampling layer (denoted as "↑").

Figure 7:
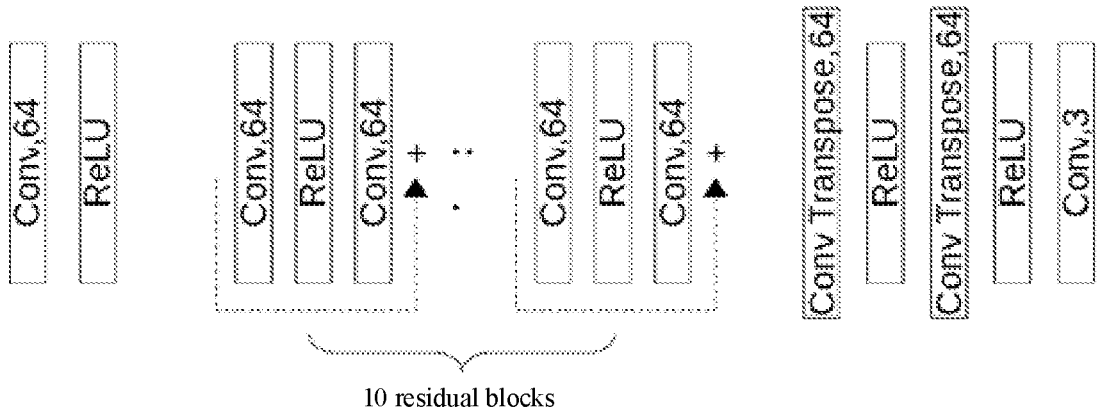
FIG. 7 is a schematic diagram of an amplification sub-network according to the present disclosure.

FIG. 7 is a schematic diagram of an amplification sub-network according to the present disclosure. As shown in FIG. 7, the sub-network includes a convolutional layer (Conv), a rectified linear unit (ReLU) excitation layer, and a convolution transpose (Conv Transpose) layer.

In an implementation, the operation 252 may include operations 2521 to 2523.

At operation 2521, respectively performing up-sampling on motion vectors $MV_{t-1}^{LR}$ and $MV_{k2}^{LR}$ corresponding to the frames subjected to motion estimation to obtain $MV_{t-1}^{SR}$, $MV_{k1}^{SR}$ and $MV_{k2}^{SR}$; where $MV_{t-1}^{LR}$, $MV_{k1}^{LR}$ and $MV_{k2}^{LR}$ are respectively amplified motion vectors of the third resolution frame ($I_{t-1}^{LR}$) before amplification of the previous non-key frame, and the second resolution frames ($I_{k1}^{LR}$, $I_{k2}^{LR}$) corresponding to the previous key frame and the next key frame adjacent to the non-key frame relative to the third resolution frame of the non-key frame obtained by motion estimation.

At operation 2522, warping, based on $MV_{t-1}^{SR}$, $MV_{k1}^{SR}$ and $MV_{k2}^{SR}$, the high resolution frame ($I_{t-1}^{SR}$) after amplification of the previous non-key frame and the first resolution frames ($I_{k1}^{SR}$, $I_{k2}^{SR}$) corresponding to the previous key frame and the next key frame adjacent to the non-key frame through a warp operation, to obtain the warped frames $I_{t-1 \to t}^{SR}$, $I_{k1 \to t}^{SR}$ and $I_{k2 \to t}^{SR}$, respectively.

At operation 2523, inputting $I_{t-1 \to t}^{SR}$, $I_{k1 \to t}^{SR}$, $I_{k2 \to t}^{SR}$, $MV_{t-1}^{SR}$, $MV_{k1}^{SR}$ and $MV_{k2}^{SR}$ into the compensation sub-network, and obtaining the intermediate high resolution feature map after motion compensation through the compensation sub-network.

As shown in FIG. 4, by means of the motion estimation sub-network and based on $I_t^{LR}$ motion estimation is performed on three low resolution frames ($I_{k1}^{LR}$, $I_{k2}^{LR}$ and $I_{t-1}^{LR}$) other than the low resolution frame of the current non-key frame to obtain corresponding motion vectors $MV_{t-1}^{LR}$, $MV_{k1}^{LR}$ and $MV_{k2}^{LR}$; the motion vectors $MV_{t-1}^{LR}$, $MV_{k1}^{LR}$ and $MV_{k2}^{LR}$ after motion estimation are respectively up-sampled to obtain the amplified $MV_{t-1}^{SR}$, $MV_{k1}^{SR}$ and $MV_{k2}^{SR}$; then $I_{t-1}^{SR}$, $I_{k1}^{SR}$ and $I_{k2}^{SR}$ are warped with $MV_{t-1}^{SR}$, $MV_{k1}^{SR}$ and $MV_{k2}^{SR}$ through a warp operation to obtain the warped frames $I_{t-1 \to t}^{SR}$, $I_{k1 \to t}^{SR}$ and $I_{k2 \to t}^{SR}$ and $I_{t-1 \to t}^{SR}$, $I_{k1 \to t}^{SR}$, $I_{k2 \to t}^{SR}$, $MV_{t-1}^{SR}$, $MV_{k1}^{SR}$ and $MV_{k2}^{SR}$ are input into the compensation sub-network, to obtain the intermediate high resolution feature map after motion compensation through the compensation sub-network. On this basis, the third resolution frame of the non-key frame is amplified by the amplification sub-network according to the intermediate high resolution feature map, to obtain the amplified target frame corresponding to the non-key frame. For each non-key frame between two adjacent key frames, the amplified target frame is obtained through such a process, until finally the third resolution frames of all non-key frames are amplified and a high-quality super resolution video is obtained.

In an implementation, if the non-key frame is a first non-key frame after an adjacent previous key frame, the second resolution frame of the previous key frame is used as the third resolution frame before amplification of the previous non-key frame of the non-key frame, and the first resolution frame of the previous key frame is used as the high resolution frame after amplification of the previous non-key frame of the non-key frame.

In this implementation, if the current non-key frame to be amplified is a first non-key frame after an adjacent previous key frame, that is, there is no other non-key frame between the non-key frame and the adjacent previous key frame, in which case in the interval of the two key frames where the non-key frame is located, there is no low resolution frame ($I_{t-1}^{LR}$) of the previous non-key frame available as a reference frame, and no corresponding amplified high resolution frame ($I_{t-1}^{SR}$), so the low resolution frame ($I_{t-1}^{LR}$) of the previous non-key frame may be replaced with the low resolution frame (second resolution frame, $I_{k1}^{LR}$) of the previous key frame, and the high resolution frame ($I_{t-1}^{SR}$) of the previous non-key frame may be replaced with the high resolution frame (first resolution frame, $I_{k1}^{SR}$) of the previous key frame. Therefore, in the absence of a previous non-key frame, a previous key frame is used as a reference frame to provide a complete basis for the amplification algorithm, and to ensure feasibility of the algorithm.

In an implementation, before amplifying, according to the first resolution frame and the second resolution frame corresponding to the key frame, the third resolution frame in the mixed resolution video, the method further includes the following operation 100. At operation 100: training, based on sample videos, the video amplification network according to a first loss function and a second loss function; where the first loss function is determined from a mean square error of an original high resolution frame of a non-key frame between two adjacent key frames in the original video, and a frame obtained by performing down-sampling on the original high resolution frame and then amplifying through the video amplification network; the second loss function is determined from a mean square error of the original high resolution frame of the non-key frame, a frame $I_{t-1 \to t}^{SR}$ obtained from the third resolution frame of the non-key frame and the third resolution frame of the previous non-key frame after motion estimation, motion vector up-sampling, and warping, a frame $I_{k1 \to t}^{SR}$ obtained from the third resolution frame of the non-key frame and the second resolution frame of an adjacent previous key frame after motion estimation, motion vector up-sampling, and warping, and a frame $I_{k2 \to t}^{SR}$ obtained from the third resolution frame of the non-key frame and the second resolution frame of an adjacent next key frame after motion estimation, motion vector up-sampling, and warping.

The video amplification network is trained in advance and has better amplification capability. In this implementation, high resolution videos of different resolutions may be obtained from a database, and subjected to coding and decoding to obtain respective mixed resolution videos which are used as sample videos for training the video amplification network, where the sample videos should contain sufficiently rich contents and features.

In this implementation, the video amplification network is trained according to the first loss function and the second loss function. The second loss function is mainly configured to train a sub-network (motion estimation sub-network) in the video amplification network. The motion estimation sub-network may be trained separately and the second loss function may be constructed in a targeted manner.

The first loss function is, for example:

$$Loss_{total} = \frac{1}{G-2} \sum_{i=1}^{G-2} MSE(I_i^{SR}, I_i^{HR}),$$

where G represents a sum of two adjacent key frames and an intermediate non-key frame(s). It can be seen that the first loss function is independent of the two frame key frames.

The second loss function is, for example: $Loss_{ME}$=MSE$(I_t^{HR}, W_b(I_{k1}^{SR}, f_{t \to k1})$+MSE$(I_t^{HR}, W_b(I_{k1}^{SR}, f_{t \to k2})$+MSE$(I_t^{HR}, W_b(I_{t-1}^{SR}, f_{t \to t-1}))$, where $I_t^{HR}$ represents an original high resolution frame of a current non-key frame to be amplified, $I_{t-1}^{SR}$ represents the amplified high resolution frame of the previous non-key frame, $f_{t-t-1}$ represents a motion vector from the non-key frame to the previous non-key frame, $f_{t-k1}$ represents a motion vector from the non-key frame to the previous key frame, $f_{t-k2}$ represents a motion vector from the non-key frame to a next key frame, and $W_b$ (backward warp) represents a backward warp operation. The principle of the video amplification network amplifying the mixed resolution video may be referred to the above implementations. When the first loss function and the second loss function are respectively stabilized around a value, training of the video amplification network is completed, and the video amplification network now has a reliable amplification capability and can be applied to amplification of low resolution frames in mixed resolution videos corresponding to other videos.

In this implementation, real, valid and diverse sample videos are selected, and so the training data of the amplification network obtained by inputting the sample videos into the video codec is also real and reliable, rather than artificially generated. Taking the video codec as a whole, real and valid training data of the video amplification network is obtained from a decoding end, and the video amplification network obtained by training is more targeted, so that the training effect is ensured, and the amplification capability of the video amplification network and the quality of the amplified video are improved.

In an implementation, the video amplification network includes a motion estimation sub-network, a motion compensation sub-network, and an amplification sub-network; and the operation 100 includes: training the video amplification network according to the first loss function, and training the motion estimation sub-network according to the second loss function, until the first loss function and the second loss function meet set conditions. The set conditions refer to that the first loss function and the second loss function are respectively stabilized around a value. For example, values of the first loss function and the second loss function have a fluctuation range less than a certain threshold.

In an implementation, before training the video amplification network according to the first loss function and the second loss function, the method further includes operation 101. At operation 101, pre-processing the sample videos to obtain a sample video with a preset resolution.

In some implementations, a part of the obtained high resolution video may be taken out to conform to a preset resolution (for example, 256*256), and then input to a video codec to be coded, to obtain a code stream of a mixed resolution, and then decoded, to obtain a mixed resolution frame.

In the video processing method of the present disclosure, a residual plot is used for coding and decoding, and merely a change area of the key frame is desired to be processed, so that a code rate of coding and decoding the key frame can be reduced. During video amplification, bidirectional key frames are used as reference frames, and when the scene changes, information of low resolution frames and high resolution frames in forward and backward directions can be fully utilized to ensure the amplification effect of the current non-key frame. For a key frame, the second resolution frame is obtained by down-sampling, so that the delay is reduced and the timeliness is improved. During the amplification process, motion vector estimation and motion compensation of the low resolution frame are also considered, so that more sufficient information of the reference frames can be obtained, and the quality of video amplification can be improved. Through motion estimation of the vector, the inter-frame redundancy can be removed and the number of bits for video transmission is greatly reduced; In addition, real and valid training data of the video amplification network is obtained from a decoding end, and the video amplification network obtained by training is more targeted, so that the training effect is ensured, and the amplification capability of the video amplification network and the quality of the amplified video are improved.

Figure 8:
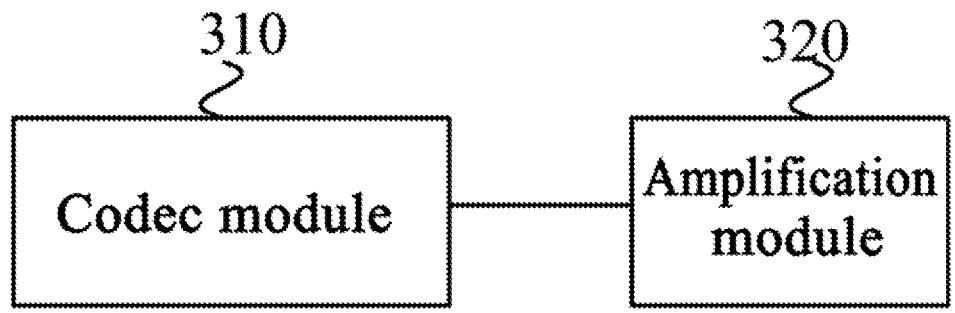
FIG. 8 is a schematic structural diagram of a video processing apparatus according to the present disclosure.

The present disclosure further provides a video processing apparatus. FIG. 8 is a schematic structural diagram of a video processing apparatus according to the present disclosure. As shown in FIG. 8, the video processing apparatus includes: a codec module 310 and an amplification module 320.

The codec module 310 is configured to code and decode an original video to obtain a mixed resolution video. The mixed resolution video includes a first resolution frame and a second resolution frame each corresponding to a key frame in the original video, and a third resolution frame corresponding to a non-key frame in the original video. The first resolution frame has a resolution higher than a resolution of the second resolution frame or a resolution of the third resolution frame.

The amplification module 320 is configured to amplify, according to the first resolution frame and the second resolution frame corresponding to the key frame, the third resolution frame corresponding to the non-key frame in the mixed resolution video to output an amplified video. The amplified video includes the first resolution frame corresponding to the key frame, and an amplified target frame corresponding to the non-key frame.

In the video processing apparatus of the present disclosure, an original video is coded and decoded to obtain a mixed resolution video; according to the first resolution frame and the second resolution frame corresponding to the key frame, the third resolution frame corresponding to the non-key frame in the mixed resolution video is amplified, so that a low resolution frame can be obtained from a non-key frame simply by coding and decoding, and then, a low resolution frame is amplified according to the key frame, so that an amplified high resolution video is obtained with fewer code streams, the bandwidth pressure of video transmission is reduced, and the subjective and objective quality of video amplification is improved.

In an implementation, the codec module 310 includes: a detection unit configured to detect a key frame in the original video; a frame processing unit configured to generate a residual plot and a second resolution frame of the key frame, and perform down-sampling on the non-key frame to obtain a third resolution frame; and a codec unit configured to perform video coding and decoding on the residual plot, the second resolution frame and the third resolution frame to obtain the mixed resolution video.

In an implementation, generating the residual plot and the second resolution frame of the key frame includes: performing down-sampling on the key frame to obtain the second resolution frame of the key frame; and performing up-sampling on the key frame to obtain a temporary frame of the first resolution frame of the key frame, and subtracting the temporary frame of the first resolution frame from the key frame to obtain the residual plot of the key frame.

In an implementation, the codec unit may be configured to: code the residual plot, the second resolution frame and the third resolution frame with a coder, to obtain a residual code stream, a code stream of the second resolution frame and a code stream of the third resolution frame; decode the residual code stream, the code stream of the second resolution frame and the code stream of the third resolution frame with a decoder, to respectively obtain the residual plot, the second resolution frame and the third resolution frame; and perform up-sampling on the second resolution frame to obtain an amplified fourth resolution frame, and add the fourth resolution frame and the residual plot to obtain the first resolution frame of the key frame.

In an implementation, the codec module 310 includes: a detection unit configured to detect a key frame in the original video; a frame processing unit configured to equally divide the key frame into a plurality of sub-images, where each sub-image has a same resolution as that of the second resolution frame, and perform down-sampling on the non-key frame to obtain a third resolution frame; and a coding unit configured to input the sub-images and the third resolution frame of the non-key frame into a video codec, where the video codec includes a coder and a decoder; code the sub-images and the third resolution frame of the non-key frame with the coder, to obtain code streams corresponding to the sub-images and the third resolution frame of the non-key frame; a decoding unit configured to splice the sub-images according to the code stream of each sub-image with the decoder, to obtain the first resolution frame of the key frame, and decode the code stream of the third resolution frame to obtain the third resolution frame.

In an implementation, the amplification module 320 includes: an input unit configured to respectively input, for each non-key frame, a third resolution frame ($I_t^{LR}$) of the non-key frame; a third resolution frame ($I_{t-1}^{LR}$) before amplification and a high resolution frame ($I_{t-1}^{SR}$) after amplification of a previous non-key frame of the non-key frame, and first resolution frames ($I_{k1}^{SR}, I_{k2}^{SR}$) and second resolution frames ($I_{k1}^{LR}, I_{k2}^{LR}$) corresponding to the previous key frame and a next key frame adjacent to the non-key frame into a video amplification network; and an amplification unit configured to amplify, according to the third resolution frame ($I_{t-1}$LR) before amplification and the high resolution frame ($I_{t-1}$SR) after amplification of the previous non-key frame of the non-key frame, and the first resolution frames ($I_{k1}^{SR}, I_{k2}^{SR}$) and the second resolution frames ($I_{k1}^{LR}, I_{k2}^{LR}$) corresponding to the previous key frame and the next key frame adjacent to the non-key frame, the third resolution frame ($I_t^{LR}$) of the non-key frame through the video amplification network to obtain the amplified target frame corresponding to the non-key frame.

In an implementation, the video amplification network includes a motion estimation sub-network, a motion compensation sub-network, and an amplification sub-network. The amplification unit may be configured to: respectively perform, based on the third resolution frame ($I_t^{LR}$) of the non-key frame, motion estimation on the third resolution frame ($I_{t-1}^{LR}$) before amplification of the previous non-key frame of the non-key frame, and the second resolution frames ($I_{k1}^{LR}, I_{k2}^{LR}$) corresponding to the previous key frame and the next key frame adjacent to the non-key frame through the motion estimation sub-network; respectively perform, according to the high resolution frame ($I_{t-1}^{SR}$) after amplification of the previous non-key frame and the first resolution frames ($I_{k1}^{SR}, I_{k2}^{SR}$) corresponding to the previous key frame and the next key frame adjacent to the non-key frame, motion compensation on each frame subjected to motion estimation and an up-sampled motion vector to obtain an intermediate high resolution feature map, and convert the intermediate high resolution feature map into a low resolution feature map through shuffle; and amplify, according to the low resolution feature map, the third resolution frame through the amplification sub-network to obtain the amplified target frame corresponding to the non-key frame.

In an implementation, respectively performing, according to the high resolution frame ($I_{t-1}^{SR}$) after amplification of the previous non-key frame and the first resolution frames ($I_{k1}^{SR}, I_{k2}^{SR}$) corresponding to the previous key frame and the next key frame adjacent to the non-key frame, motion compensation on each frame subjected to motion estimation and an up-sampled motion vector to obtain the intermediate high resolution feature map includes: respectively performing up-sampling on motion vectors $MV_{t-1}^{LR} MV_{k1}^{LR}$ and $MV_{k2}^{LR}$ corresponding to the frames subjected to motion estimation to obtain $MV_{t-1}^{SR}$, $MV_{k1}^{SR}$ and $MV_{k2}^{SR}$; where $MV_{t-1}^{LR}$, $MV_{k1}^{LR}$ and $MV_{k2}^{LR}$ are respectively amplified motion vectors of the third resolution frame ($I_{t-1}^{LR}$) before amplification of the previous non-key frame, and the second resolution frames ($I_{k1}^{LR}, I_{k2}^{LR}$) corresponding to the previous key frame and the next key frame adjacent to the non-key frame relative to the third resolution frame of the non-key frame obtained by motion estimation; warping, based on $MV_{t-1}^{SR}$, $MV_{k1}^{SR}$ and $MV_{k2}^{SR}$, the high resolution frame ($I_{t-1}^{SR}$) after amplification of the previous non-key frame and the first resolution frames ($I_{k1}^{SR}, I_{k2}^{SR}$) corresponding to the previous key frame and the next key frame adjacent to the non-key frame through a warp operation, to obtain the warped frames $I_{t-1 \to t}^{SR}$, $I_{k1 \to t}^{SR}$ and $I_{k2 \to t}^{SR}$, respectively; inputting $I_{t-1 \to t}^{SR}$, $I_{k1 \to t}^{SR}$, $I_{k2 \to t}^{SR}$, $MV_{t-1}^{SR}$, $MV_{k1}^{SR}$ and $MV_{k2}^{SR}$ into the compensation sub-network, and obtaining the intermediate high resolution feature map after motion compensation through the compensation sub-network.

In an implementation, if the non-key frame is a first non-key frame after an adjacent previous key frame, the second resolution frame of the previous key frame is used as the third resolution frame before amplification of the previous non-key frame of the non-key frame, and the first resolution frame of the previous key frame is used as the high resolution frame after amplification of the previous non-key frame of the non-key frame.

In an implementation, the apparatus further includes: a training module configured to, before amplifying, according to the first resolution frame and the second resolution frame corresponding to the key frame, the third resolution frame in the mixed resolution video, train, based on sample videos, the video amplification network according to a first loss function and a second loss function. The first loss function is determined from a mean square error of an original high resolution frame of a non-key frame between two adjacent key frames in the original video, and a frame obtained by performing down-sampling on the original high resolution frame and then amplifying through the video amplification network. The second loss function is determined from a mean square error of the original high resolution frame of the non-key frame, a frame $I_{t-1 \to t}^{SR}$ obtained from the third resolution frame of the non-key frame and the third resolution frame of the previous non-key frame after motion estimation, motion vector up-sampling, and warping, a frame $I_{k1 \to t}^{SR}$ obtained from the third resolution frame of the non-key frame and the second resolution frame of an adjacent previous key frame after motion estimation, motion vector up-sampling, and warping, and a frame $I_{k2 \to t}^{SR}$ obtained from the third resolution frame of the non-key frame and the second resolution frame of an adjacent next key frame after motion estimation, motion vector up-sampling, and warping.

In an implementation, the video amplification network includes a motion estimation sub-network, a motion compensation sub-network, and an amplification sub-network; and training the video amplification network according to the first loss function and the second loss function includes: training the video amplification network according to the first loss function, and training the motion estimation sub-network according to the second loss function, until the first loss function and the second loss function meet set conditions.

In an implementation, the apparatus further includes: a pre-processing module configured to, before training the video amplification network according to the first loss function and the second loss function, pre-process the sample videos to obtain a sample video with a preset resolution.

The video processing apparatus proposed in the present disclosure is of a same concept as the video processing method described above, technical details that are not described in detail in the implementations of the video processing apparatus may be referred to any of the implementations described above, and the video processing apparatus has the same beneficial effects as the video processing method.

Figure 9:
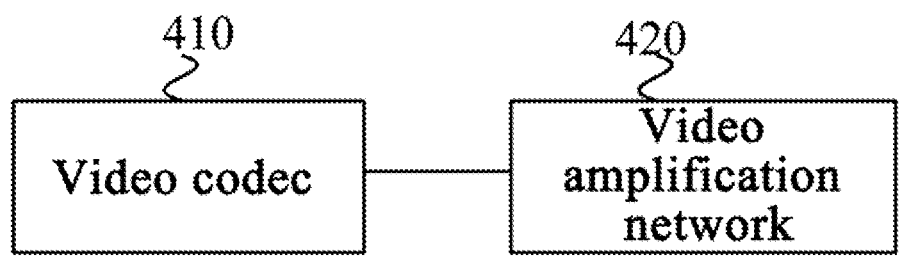
FIG. 9 is a schematic structural diagram of a video processing system according to the present disclosure.

The present disclosure further provides a video processing system. FIG. 9 is a schematic structural diagram of a video processing system according to the present disclosure. As shown in FIG. 9, the system includes: a video codec 410 configured to process an original video to obtain a mixed resolution video, where the mixed resolution video includes a first resolution frame and a second resolution frame each corresponding to a key frame in the original video, and a third resolution frame corresponding to a non-key frame in the original video, where the first resolution frame has a resolution higher than a resolution of the second resolution frame or a resolution of the third resolution frame; and a video amplification network 420 configured to amplify, according to the first resolution frame and the second resolution frame corresponding to the key frame, the third resolution frame corresponding to the non-key frame in the mixed resolution video to output an amplified video, where the amplified video includes the first resolution frame corresponding to the key frame, and an amplified target frame corresponding to the non-key frame.

In an implementation, the video codec 410 may be configured to: detect a key frame in the original video; generate a residual plot and a second resolution frame of the key frame, and perform down-sampling on the non-key frame to obtain a third resolution frame; and perform video coding and decoding on the residual plot, the second resolution frame and the third resolution frame to obtain the mixed resolution video.

In an implementation, generating the residual plot and the second resolution frame of the key frame includes: performing down-sampling on the key frame to obtain the second resolution frame of the key frame; and performing up-sampling on the key frame to obtain a temporary frame of the first resolution frame of the key frame, and subtracting the temporary frame of the first resolution frame from the key frame to obtain the residual plot of the key frame.

In an implementation, performing video coding and decoding on the residual plot, the second resolution frame and the third resolution frame to obtain the mixed resolution video includes: coding the residual plot, the second resolution frame and the third resolution frame with a coder, to obtain a residual code stream, a code stream of the second resolution frame and a code stream of the third resolution frame; decoding the residual code stream, the code stream of the second resolution frame and the code stream of the third resolution frame with a decoder, to respectively obtain the residual plot, the second resolution frame and the third resolution frame; and performing up-sampling on the second resolution frame to obtain an amplified fourth resolution frame, and adding the fourth resolution frame and the residual plot to obtain the first resolution frame of the key frame.

In an implementation, the video amplification network 420 may be configured to: input, for each non-key frame, a third resolution frame ($I_t^{LR}$) of the non-key frame; a third resolution frame ($I_{t-1}^{LR}$) before amplification and a high resolution frame ($I_{t-1}^{SR}$) after amplification of a previous non-key frame of the non-key frame, and first resolution frames ($I_{k1}^{SR}$, $I_{k2}^{SR}$) and second resolution frames ($I_{k1}^{LR}$, $I_{k2}^{LR}$) corresponding to the previous key frame and a next key frame adjacent to the non-key frame into a video amplification network; and an amplification unit configured to amplify, according to the third resolution frame ($I_{t-1}^{LR}$) before amplification and the high resolution frame ($I_{t-1}^{SR}$) after amplification of the previous non-key frame of the non-key frame, and the first resolution frames ($I_{k1}^{SR}$, $I_{k2}^{SR}$) and the second resolution frames ($I_{k1}^{LR}$, $I_{k2}^{LR}$) corresponding to the previous key frame and the next key frame adjacent to the non-key frame, the third resolution frame ($I_t^{LR}$) of the non-key frame through the video amplification network to obtain the amplified target frame corresponding to the non-key frame.

In an implementation, the video amplification network includes a motion estimation sub-network, a motion compensation sub-network, and an amplification sub-network; and amplify, according to the third resolution frame ($I_{t-1}$LR) before amplification and the high resolution frame ($I_{t-1}$SR) after amplification of the previous non-key frame of the non-key frame, and the first resolution frames ($I_{k1}^{SR}$, $I_{k2}^{SR}$) and the second resolution frames ($I_{k1}^{LR}$, $I_{k2}^{LR}$) corresponding to the previous key frame and the next key frame adjacent to the non-key frame, the third resolution frame ($I_t^{LR}$) of the non-key frame to obtain the amplified target frame corresponding to the non-key frame includes: respectively performing, based on the third resolution frame ($I_t^{LR}$) of the non-key frame, motion estimation on the third resolution frame ($I_{t-1}^{LR}$) before amplification of the previous non-key frame of the non-key frame, and the second resolution frames ($I_{k1}^{LR}$, $I_{k2}^{LR}$) corresponding to the previous key frame and the next key frame adjacent to the non-key frame through the motion estimation sub-network; respectively performing, according to the high resolution frame ($I_{t-1}^{SR}$) after amplification of the previous non-key frame and the first resolution frames ($I_{k1}^{SR}$, $I_{k2}^{SR}$) corresponding to the previous key frame and the next key frame adjacent to the non-key frame, motion compensation on each frame subjected to motion estimation and an up-sampled motion vector to obtain an intermediate high resolution feature map, and converting the intermediate high resolution feature map into a low resolution feature map through shuffle; and amplifying, according to the low resolution feature map, the third resolution frame through the amplification sub-network to obtain the amplified target frame corresponding to the non-key frame.

In an implementation, respectively performing, according to the high resolution frame ($I_{t-1}^{SR}$) after amplification of the previous non-key frame and the first resolution frames ($I_{k1}^{SR}$, $I_{k2}^{SR}$) corresponding to the previous key frame and the next key frame adjacent to the non-key frame, motion compensation on each frame subjected to motion estimation and an up-sampled motion vector to obtain the intermediate high resolution feature map includes: respectively performing up-sampling on motion vectors $MV_{t-1}^{LR}$, $MV_{k1}^{LR}$ and $MV_{k2}^{LR}$ corresponding to the frames subjected to motion estimation to obtain $MV_{t-1}^{SR}$, $MV_{k1}^{SR}$ and $MV_{k2}^{SR}$; where $MV_{t-1}^{LR}$, $MV_{k1}^{LR}$ and $MV_{k2}^{LR}$ are respectively amplified motion vectors of the third resolution frame ($I_{t-1}^{LR}$) before amplification of the previous non-key frame, and the second resolution frames ($I_{k1}^{LR}$, $I_{k2}^{LR}$) corresponding to the previous key frame and the next key frame adjacent to the non-key frame relative to the third resolution frame of the non-key frame obtained by motion estimation; warping, based on $MV_{t-1}^{SR}$, $MV_{k1}^{SR}$ and $MV_{k2}^{SR}$, the high resolution frame ($I_{t-1}^{SR}$) after amplification of the previous non-key frame and the first resolution frames ($I_{k1}^{SR}$, $I_{k2}^{SR}$) corresponding to the previous key frame and the next key frame adjacent to the non-key frame through a warp operation, to obtain the warped frames $I_{t-1 \to t}^{SR}$, $I_{k1 \to t}^{SR}$ and $I_{k2 \to t}^{SR}$, respectively; inputting $I_{t-1 \to t}^{SR}$, $I_{k1 \to t}^{SR}$, $I_{k2 \to t}^{SR}$, $MV_{t-1}^{SR}$, $MV_{k1}^{SR}$ and $MV_{k2}^{SR}$ into the compensation sub-network, and obtaining the intermediate high resolution feature map after motion compensation through the compensation sub-network.

In an implementation, if the non-key frame is a first non-key frame after an adjacent previous key frame, the second resolution frame of the previous key frame is used as the third resolution frame before amplification of the previous non-key frame of the non-key frame, and the first resolution frame of the previous key frame is used as the high resolution frame after amplification of the previous non-key frame of the non-key frame.

In an implementation, before amplifying, according to the first resolution frame and the second resolution frame corresponding to the key frame, the third resolution frame in the mixed resolution video, based on sample videos, the video amplification network is trained according to a first loss function and a second loss function. The first loss function is determined from a mean square error of an original high resolution frame of a non-key frame between two adjacent key frames in the original video, and a frame obtained by performing down-sampling on the original high resolution frame and then amplifying through the video amplification network. The second loss function is determined from a mean square error of the original high resolution frame of the non-key frame, a frame $I_{t-1 \to t}^{SR}$ obtained from the third resolution frame of the non-key frame and the third resolution frame of the previous non-key frame after motion estimation, motion vector up-sampling, and warping, a frame $I_{k1 \to t}^{SR}$ obtained from the third resolution frame of the non-key frame and the second resolution frame of an adjacent previous key frame after motion estimation, motion vector up-sampling, and warping, and a frame $I_{k2 \to t}^{SR}$ obtained from the third resolution frame of the non-key frame and the second resolution frame of an adjacent next key frame after motion estimation, motion vector up-sampling, and warping.

In an implementation, the video amplification network 420 includes a motion estimation sub-network, a motion compensation sub-network, and an amplification sub-network; and training the video amplification network according to the first loss function and the second loss function includes: training the video amplification network according to the first loss function, and training the motion estimation sub-network according to the second loss function, until the first loss function and the second loss function meet set conditions.

In an implementation, before training the video amplification network according to the first loss function and the second loss function, the sample videos are pre-processed to obtain a sample video with a preset resolution.

The video processing system provided in the present disclosure is of a same concept as the video processing method described above, technical details that are not described in detail in the implementations of the video processing system may be referred to any of the implementations described above, and the video processing system has the same beneficial effects as the video processing method.

The present disclosure further provides a device. The video processing method may be performed by a video processing apparatus, which may be implemented in software and/or hardware, and integrated in the device.

Figure 10:
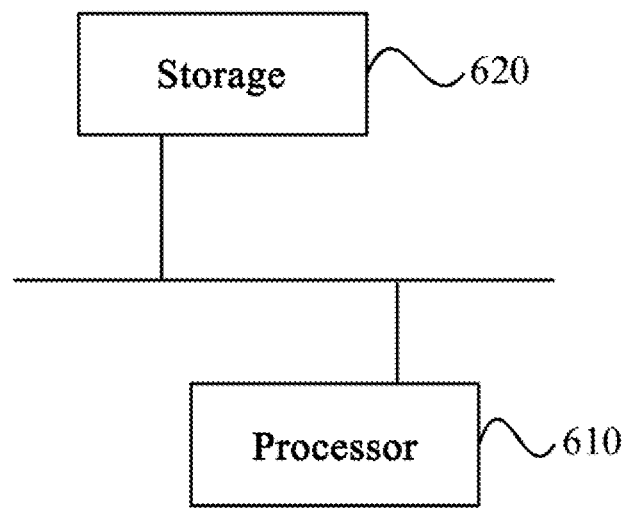
FIG. 10 is a schematic hardware diagram of a device according to the present disclosure.

FIG. 10 is a schematic hardware diagram of a device according to the present disclosure. As shown in FIG. 10, the present disclosure provides a device, including: a processor 610 and a storage 520. One or more processors may be provided in the device, and FIG. 10 illustrates an example including one processor 610. The processor 610 and the storage 620 in the device may be connected via a bus or by other means, and FIG. 10 illustrates the connection via a bus as an example. As a computer-readable storage medium, the storage 620 in the device may be configured to store one or more programs.

The one or more programs, when executed by the one or more processors 610, cause the one or more processors to perform the video processing method according to any of the above implementations. The method includes: coding and decoding an original video to obtain a mixed resolution video, where the mixed resolution video includes a first resolution frame and a second resolution frame each corresponding to a key frame in the original video, and a third resolution frame corresponding to a non-key frame in the original video, where the first resolution frame has a resolution higher than that of the second resolution frame or that of the third resolution frame; and amplifying, according to the first resolution frame and the second resolution frame corresponding to the key frame, the third resolution frame corresponding to the non-key frame in the mixed resolution video to output an amplified video, where the amplified video includes the first resolution frame corresponding to the key frame, and an amplified target frame corresponding to the non-key frame.

The programs may be software programs, computer-executable programs, and modules, such as program instructions/modules corresponding to the video processing method in the present disclosure (for example, modules in the video processing apparatus shown in FIG. 8, including: the codec module 310 and the amplification module 320). The processor 610 executes the software programs, instructions and modules stored in the storage 620 to implement various functional applications and data processing of the device, that is, to implement the video processing method in the method implementations described above.

The storage 620 mainly includes a program storage area and a data storage area. The program storage area may store an operating system, or an application program required for at least one function; and the data storage area may store data created according to the use of the apparatus, and the like (e.g., the mixed resolution video, the third resolution frame, or the like in the above implementations). Further, the storage 620 may include a high speed random access memory, and may further include a non-volatile memory, such as at least one magnetic disk memory device, flash memory device, or other non-volatile solid state memory devices. In some examples, the storage 620 may further include a memory remotely disposed relative to the processor 610, which may be connected to the apparatus via a network. Examples of such networks include, but are not limited to, the Internet, intranets, local area networks, mobile communication networks, and combinations thereof.

Further, when executed by the one or more processors 610, the one or more programs on the device cause the operations of: coding and decoding an original video to obtain a mixed resolution video, where the mixed resolution video includes a first resolution frame and a second resolution frame each corresponding to a key frame in the original video, and a third resolution frame corresponding to a non-key frame in the original video, where the first resolution frame has a resolution higher than the second resolution frame and the third resolution frame; and amplifying, according to the first resolution frame and the second resolution frame corresponding to the key frame, the third resolution frame corresponding to the non-key frame in the mixed resolution video to output an amplified video, where the amplified video includes the first resolution frame corresponding to the key frame, and an amplified target frame corresponding to the non-key frame, to be implemented.

The device proposed in the present disclosure is of a same concept as the video processing method described above, technical details that are not described in detail in the implementations of the device may be referred to any of the implementations described above, and the device has the same beneficial effects as the video processing method.

The present disclosure further provides a storage medium containing computer-executable instructions which, when executed by a processor, cause the processor to implement a video processing method. The method includes: coding and decoding an original video to obtain a mixed resolution video, where the mixed resolution video includes a first resolution frame and a second resolution frame each corresponding to a key frame in the original video, and a third resolution frame corresponding to a non-key frame in the original video, where the first resolution frame has a resolution higher than the second resolution frame and the third resolution frame; and amplifying, according to the first resolution frame and the second resolution frame corresponding to the key frame, the third resolution frame corresponding to the non-key frame in the mixed resolution video to output an amplified video, wherein the amplified video includes the first resolution frame corresponding to the key frame, and an amplified target frame corresponding to the non-key frame.

Through the description of the above implementations, those skilled in the art may understand that the present disclosure may be implemented by means of software and general hardware, or by hardware. Based on such understanding, the technical solution the present disclosure may be embodied in the form of software products. The computer software product may be stored in a computer-readable storage medium, such as a computer floppy disk, a read-only memory (ROM), a random access memory (RAM), a flash memory (FLASH), a hard disk or an optical disk, and includes a plurality of instructions for causing a computer device (which may be a personal computer, a server, or a network device, etc.) to perform the method described in any implementation of the present disclosure.

The above are merely exemplary implementations of the present disclosure and not intended to limit the scope of the present disclosure.

The block diagrams of any logic flow in the figures of the present disclosure may represent program operations, or may represent interconnected logic circuits, modules, and functions, or may represent a combination of program operations and logic circuits, modules, and functions. The computer program may be stored on a memory. The memory may be of any type suitable to the local technical environment and may be implemented in any suitable data storage technology, such as but not limited to, read only memories (ROMs), random access memories (RAMs), optical storage devices or systems (digital versatile discs (DVDs), compact discs (CDs)), etc. The computer-readable medium may include a non-transitory storage medium. The data processor may be of any type suitable to the local technical environment, such as but not limited to, general purpose computers, dedicated computers, microprocessors, digital signal processors (DSPs), application specific integrated circuits (ASICs), field programmable gate arrays (FGPAs), and processors based on multi-core processor architecture.

The foregoing has provided by way of exemplary and non-limiting examples a detailed description of exemplary implementations of the present disclosure. Various modifications and adaptations to the foregoing implementations may become apparent to those skilled in the art in view of the accompanying drawings and the appended claims, without departing from the scope of the present disclosure. Accordingly, the proper scope of the present disclosure is to be determined according to the claims.

What is claimed is:

1. A video processing method, comprising:
coding and decoding an original video to obtain a mixed resolution video, wherein the mixed resolution video comprises a first resolution frame and a second resolution frame each corresponding to a key frame in the original video, and a third resolution frame corresponding to a non-key frame in the original video, wherein the first resolution frame has a resolution higher than a resolution of the second resolution frame or a resolution of the third resolution frame; and
amplifying, according to the first resolution frame and the second resolution frame corresponding to the key frame, the third resolution frame corresponding to the non-key frame in the mixed resolution video to output an amplified video, wherein the amplified video comprises the first resolution frame corresponding to the key frame, and an amplified target frame corresponding to the non-key frame,
wherein amplifying, according to the first resolution frame and the second resolution frame corresponding to the key frame, the third resolution frame in the mixed resolution video comprises:
inputting, for each non-key frame, the third resolution frame of the non-key frame, the third resolution frame before amplification and a high resolution frame after amplification of a previous non-key frame of the non-key frame, and first resolution frames and second resolution frames corresponding to the previous key frame and a next key frame adjacent to the non-key frame into a video amplification network;
amplifying, according to the third resolution frame before amplification and the high resolution frame after amplification of the previous non-key frame of the non-key frame, and the first resolution frames and the second resolution frames corresponding to the previous key frame and the next key frame adjacent to the non-key frame, the third resolution frame of the non-key frame through the video amplification network to obtain the amplified target frame corresponding to the non-key frame.

2. The method according to claim 1, wherein coding and decoding the original video to obtain the mixed resolution video comprises:
   detecting the key frame in the original video;
   generating a residual plot and the second resolution frame of the key frame, and performing down-sampling on the non-key frame to obtain the third resolution frame; and
   performing video coding and decoding on the residual plot, the second resolution frame and the third resolution frame to obtain the mixed resolution video.

3. The method according to claim 2, wherein generating the residual plot and the second resolution frame of the key frame comprises:
   performing down-sampling on the key frame to obtain the second resolution frame of the key frame; and
   performing up-sampling on the key frame to obtain a temporary frame of the first resolution frame of the key frame, and subtracting the temporary frame of the first resolution frame from the key frame to obtain the residual plot of the key frame.

4. The method according to claim 2, wherein performing video coding and decoding on the residual plot, the second resolution frame and the third resolution frame to obtain the mixed resolution video comprises:
   coding the residual plot, the second resolution frame and the third resolution frame with a coder, to obtain a residual code stream, a code stream of the second resolution frame and a code stream of the third resolution frame;
   decoding the residual code stream, the code stream of the second resolution frame and the code stream of the third resolution frame with a decoder, to respectively obtain the residual plot, the second resolution frame and the third resolution frame; and
   performing up-sampling on the second resolution frame to obtain an amplified fourth resolution frame, and adding the fourth resolution frame and the residual plot to obtain the first resolution frame of the key frame.

5. The method according to claim 1, wherein coding and decoding the original video to obtain the mixed resolution video comprises:
   detecting the key frame in the original video;
   equally dividing the key frame into a plurality of sub-images, wherein each sub-image has a same resolution as a resolution of the second resolution frame, and performing down-sampling on the non-key frame to obtain the third resolution frame; and
   inputting the plurality of sub-images and the third resolution frame of the non-key frame into a video codec, wherein the video codec comprises a coder and a decoder;
   coding the plurality of sub-images and the third resolution frame of the non-key frame with the coder, to obtain code streams corresponding to the plurality of sub-images and the third resolution frame of the non-key frame;
   splicing the plurality of sub-images according to the code streams of the plurality of sub-images with the decoder, to obtain the first resolution frame of the key frame, and decoding the code stream of the third resolution frame to obtain the third resolution frame.

6. The method according to claim 1, wherein the video amplification network comprises a motion estimation sub-network, a motion compensation sub-network, and an amplification sub-network; and
   amplifying, according to the third resolution frame before amplification and the high resolution frame after amplification of the previous non-key frame of the non-key frame, and the first resolution frames and the second resolution frames corresponding to the previous key frame and the next key frame adjacent to the non-key frame, the third resolution frame of the non-key frame through the video amplification network to obtain the amplified target frame corresponding to the non-key frame comprises:
   respectively performing, based on the third resolution frame of the non-key frame, motion estimation on the third resolution frame before amplification of the previous non-key frame of the non-key frame, and the second resolution frames corresponding to the previous key frame and the next key frame adjacent to the non-key frame through the motion estimation sub-network;
   respectively performing, according to the high resolution frame after amplification of the previous non-key frame and the first resolution frames corresponding to the previous key frame and the next key frame adjacent to the non-key frame, motion compensation on each frame subjected to motion estimation and an up-sampled motion vector to obtain an intermediate high resolution feature map, and converting the intermediate high resolution feature map into a low resolution feature map through shuffle; and
   amplifying, according to the low resolution feature map, the third resolution frame through the amplification sub-network to obtain the amplified target frame corresponding to the non-key frame.

7. The method according to claim 6, wherein respectively performing, according to the high resolution frame after amplification of the previous non-key frame and the first resolution frames corresponding to the previous key frame and the next key frame adjacent to the non-key frame, motion compensation on each frame subjected to motion estimation and the up-sampled motion vector to obtain the intermediate high resolution feature map comprises:
   respectively performing up-sampling on motion vectors $MV_{t-1}^{LR}$, $MV_{k1}^{LR}$ and $MV_{k2}^{LR}$ corresponding to frames subjected to motion estimation to obtain $MV_{t-1}^{SR}$, $MV_{k1}^{SR}$ and $MV_{k2}^{SR}$; wherein $MV_{t-1}^{LR}$, $MV_{k1}^{LR}$ and $MV_{k2}^{LR}$ are respectively amplified motion vectors of the third resolution frame before amplification of the previous non-key frame, and the second resolution frames corresponding to the previous key frame and the next key frame adjacent to the non-key frame relative to the third resolution frame of the non-key frame obtained by motion estimation;
   warping, based on $MV_{t-1}^{SR}$, $MV_{k1}^{SR}$ and $MV_{k2}^{SR}$, the high resolution frame after amplification of the previous non-key frame and the first resolution frames corresponding to the previous key frame and the next key frame adjacent to the non-key frame through a warp operation, to obtain the warped frames $I_{t-1 \to t}^{SR}$, $I_{k1 \to t}^{SR}$ and $I_{k2 \to t}^{SR}$, respectively;
   inputting into the $I_{t-1 \to t}^{SR}$, $I_{k1 \to t}^{SR}$, $I_{k2 \to t}^{SR}$, $MV_{t-1}^{SR}$, $MV_{k1}^{SR}$ and $MV_{k2}^{SR}$ into the compensation sub-network, and obtaining the intermediate high resolution feature map after motion compensation through the compensation sub-network.

8. The method according to claim 1, wherein in a case where the non-key frame is a first non-key frame after the adjacent previous key frame, the second resolution frame of the previous key frame is used as the third resolution frame before amplification of the previous non-key frame of the non-key frame, and the first resolution frame of the previous key frame is used as the high resolution frame after amplification of the previous non-key frame of the non-key frame.

9. The method according to claim 7, wherein before amplifying, according to the first resolution frame and the second resolution frame corresponding to the key frame, the third resolution frame in the mixed resolution video, the method further comprises:
  training, based on sample videos, the video amplification network according to a first loss function and a second loss function, wherein the video amplification network is configured to amplifying, according to the first resolution frame and the second resolution frame corresponding to the key frame, the third resolution frame in the mixed resolution video;
  wherein the first loss function is determined from a mean square error of an original high resolution frame of a non-key frame between two adjacent key frames in the original video, and a frame obtained by performing down-sampling on the original high resolution frame and then amplifying through the video amplification network;
  the second loss function is determined from a mean square error of the original high resolution frame of the non-key frame, the frame $I_{t-1 \to t}^{SR}$ obtained from the third resolution frame of the non-key frame and the third resolution frame of the previous non-key frame after motion estimation, motion vector up-sampling, and warping, the frame $I_{k1 \to t}^{SR}$ obtained from the third resolution frame of the non-key frame and the second resolution frame of the adjacent previous key frame after motion estimation, motion vector up-sampling, and warping, and the frame $I_{k2 \to t}^{SR}$ obtained from the third resolution frame of the non-key frame and the second resolution frame of the adjacent next key frame after motion estimation, motion vector up-sampling, and warping.

10. The method according to claim 9, wherein the video amplification network comprises the motion estimation sub-network, the motion compensation sub-network, and the amplification sub-network; and
  training the video amplification network according to the first loss function and the second loss function comprises:
  training the video amplification network according to the first loss function, and training the motion estimation sub-network according to the second loss function, until the first loss function and the second loss function meet set conditions.

11. The method according to claim 9, wherein before training the video amplification network according to the first loss function and the second loss function, the method further comprises:
  pre-processing the sample videos to obtain a sample video with a preset resolution.

12. A device, comprising:
  one or more processors;
  a storage having one or more programs stored thereon which, when executed by the one or more processors, cause the one or more processors to implement a video processing method, comprising:
    coding and decoding an original video to obtain a mixed resolution video, wherein the mixed resolution video comprises a first resolution frame and a second resolution frame each corresponding to a key frame in the original video, and a third resolution frame corresponding to a non-key frame in the original video, wherein the first resolution frame has a resolution higher than a resolution of the second resolution frame or a resolution of the third resolution frame; and
    amplifying, according to the first resolution frame and the second resolution frame corresponding to the key frame, the third resolution frame corresponding to the non-key frame in the mixed resolution video to output an amplified video, wherein the amplified video comprises the first resolution frame corresponding to the key frame, and an amplified target frame corresponding to the non-key frame,
    wherein amplifying, according to the first resolution frame and the second resolution frame corresponding to the key frame, the third resolution frame in the mixed resolution video comprises:
    inputting, for each non-key frame, the third resolution frame of the non-key frame, the third resolution frame before amplification and a high resolution frame after amplification of a previous non-key frame of the non-key frame, and first resolution frames and second resolution frames corresponding to the previous key frame and a next key frame adjacent to the non-key frame into a video amplification network;
    amplifying, according to the third resolution frame before amplification and the high resolution frame after amplification of the previous non-key frame of the non-key frame, and the first resolution frames and the second resolution frames corresponding to the previous key frame and the next key frame adjacent to the non-key frame, the third resolution frame of the non-key frame through the video amplification network to obtain the amplified target frame corresponding to the non-key frame.

13. A non-transitory computer-readable storage medium having a computer program stored thereon which, when executed by a processor, causes the processor to implement a video processing method, comprising:
  coding and decoding an original video to obtain a mixed resolution video, wherein the mixed resolution video comprises a first resolution frame and a second resolution frame each corresponding to a key frame in the original video, and a third resolution frame corresponding to a non-key frame in the original video, wherein the first resolution frame has a resolution higher than a resolution of the second resolution frame or a resolution of the third resolution frame; and
  amplifying, according to the first resolution frame and the second resolution frame corresponding to the key frame, the third resolution frame corresponding to the non-key frame in the mixed resolution video to output an amplified video, wherein the amplified video comprises the first resolution frame corresponding to the key frame, and an amplified target frame corresponding to the non-key frame,
  wherein amplifying, according to the first resolution frame and the second resolution frame corresponding to the key frame, the third resolution frame in the mixed resolution video comprises:
  inputting, for each non-key frame, the third resolution frame of the non-key frame, the third resolution frame before amplification and a high resolution frame after amplification of a previous non-key frame of the non-key frame, and first resolution frames and second resolution frames corresponding to the previous key frame and a next key frame adjacent to the non-key frame into a video amplification network;

amplifying, according to the third resolution frame before amplification and the high resolution frame after amplification of the previous non-key frame of the non-key frame, and the first resolution frames and the second resolution frames corresponding to the previous key frame and the next key frame adjacent to the non-key frame, the third resolution frame of the non-key frame through the video amplification network to obtain the amplified target frame corresponding to the non-key frame.

* * * * *

UNITED STATES PATENT AND TRADEMARK OFFICE
CERTIFICATE OF CORRECTION

| | |
|---|---|
| PATENT NO. | : 12,200,248 B2 |
| APPLICATION NO. | : 18/010356 |
| DATED | : January 14, 2025 |
| INVENTOR(S) | : Wei Yang et al. |

Page 1 of 1

It is certified that error appears in the above-identified patent and that said Letters Patent is hereby corrected as shown below:

In the Specification

Column 9, Line 9, the parameter reading:
- $MV_{t-1}^{LR}$ and $MV_{k2}^{LR}$ -
Should read:
-- $MV_{t-1}^{LR}$, $MV_{k1}^{LR}$ and $MV_{k2}^{LR}$ --

Column 11, Line 3, the parameter reading:
- $f_{t\text{-}t\text{-}1}$ -
Should read:
-- $f_{t \rightarrow t-1}$ --

Column 11, Line 5, the parameter reading:
- $f_{t\text{-}k1}$ -
Should read:
-- $f_{t \rightarrow k1}$ --

Column 11, Line 6, the parameter reading:
- $f_{t\text{-}k2}$ -
Should read:
-- $f_{t \rightarrow k2}$ --

Signed and Sealed this
Ninth Day of December, 2025

John A. Squires
*Director of the United States Patent and Trademark Office*